US010185359B2

(12) United States Patent
Nakamura

(10) Patent No.: US 10,185,359 B2
(45) Date of Patent: Jan. 22, 2019

(54) DOCKING UNIT AND ELECTRONIC APPARATUS SYSTEM

(71) Applicant: LENOVO (SINGAPORE) PTE. LTD., Singapore (SG)

(72) Inventor: Fusanobu Nakamura, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 63 days.

(21) Appl. No.: 15/648,751

(22) Filed: Jul. 13, 2017

(65) Prior Publication Data

US 2018/0307274 A1 Oct. 25, 2018

(30) Foreign Application Priority Data

Apr. 19, 2017 (JP) .................................. 2017-82812

(51) Int. Cl.
G06F 1/16 (2006.01)
G06F 13/40 (2006.01)
G06F 1/20 (2006.01)

(52) U.S. Cl.
CPC ............ G06F 1/1632 (2013.01); G06F 1/206 (2013.01); G06F 13/4081 (2013.01)

(58) Field of Classification Search
CPC .... G06F 1/1632; G06F 1/206; G06F 13/4081; G06F 3/0414; G06F 1/16; G06F 1/20; G06F 1/203; H05K 1/0203; H05K 1/181; H05K 2201/10371; H05K 5/00; H05K 7/20; H05K 7/20127; H05K 7/20136; H05K 7/20145; H05K 7/202; H05K 7/20209

See application file for complete search history.

(56) References Cited

U.S. PATENT DOCUMENTS

| 6,212,069 B1* | 4/2001 | Janik | G06F 1/1616 165/86 |
| 6,243,261 B1* | 6/2001 | Janik | G06F 1/1615 361/679.46 |
| 6,275,945 B1* | 8/2001 | Tsuji | G06F 1/1632 361/679.4 |
| 6,711,014 B2* | 3/2004 | Anzai | G06F 1/18 165/80.3 |

(Continued)

FOREIGN PATENT DOCUMENTS

| JP | 2017045043 A | | 3/2017 |
| KR | 20030011384 A | * | 2/2003 |

*Primary Examiner* — Dimary Lopez Cruz
*Assistant Examiner* — Ingrid Wright
(74) *Attorney, Agent, or Firm* — Shimokaji IP

(57) ABSTRACT

To provide a docking device capable of securing heat dissipation performance of a portable information apparatus while extending the function of an electronic apparatus in which an extension unit is mounted on the portable information apparatus, and an electronic apparatus system having the docking device. A docking unit that has a docking portion capable of docking an electronic apparatus in which a mounting surface of an extension unit is detachably mounted on a back surface of the portable information apparatus, a holding portion holding the portable information apparatus at a predetermined position in a docking direction when the electronic apparatus is docked with the docking portion, and a forcibly moving portion forcibly moving the extension unit in the docking direction when the electronic apparatus is docked with the docking portion.

8 Claims, 11 Drawing Sheets

(56) References Cited

U.S. PATENT DOCUMENTS

| | | | | |
|---|---|---|---|---|
| 7,472,215 B1* | 12/2008 | Mok | ................ | G06F 1/1632 |
| | | | | 710/304 |
| 8,493,735 B2* | 7/2013 | Iijima | ................ | G06F 1/20 |
| | | | | 361/679.53 |
| 8,926,414 B1* | 1/2015 | Kirkpatrick | ........ | H05K 7/20136 |
| | | | | 361/679.41 |
| 2003/0128510 A1* | 7/2003 | Anzai | ................ | G06F 1/18 |
| | | | | 361/679.48 |
| 2006/0133031 A1* | 6/2006 | Hara | ................ | G06F 1/1632 |
| | | | | 361/679.26 |
| 2007/0247114 A1* | 10/2007 | Makwana | ............ | G06F 1/1632 |
| | | | | 320/116 |
| 2009/0077296 A1* | 3/2009 | Mok | ................ | G06F 1/1632 |
| | | | | 710/304 |
| 2010/0195279 A1* | 8/2010 | Michael | ............ | G06F 1/1632 |
| | | | | 361/679.41 |
| 2012/0327581 A1* | 12/2012 | Pais | ................ | G06F 1/1632 |
| | | | | 361/679.26 |

* cited by examiner

DOCKING UNIT AND ELECTRONIC APPARATUS SYSTEM

FIELD OF THE INVENTION

The present invention relates to a docking unit capable of docking an electronic apparatus in which an extension unit is mounted on a portable information apparatus and an electronic apparatus system having the docking unit.

BACKGROUND OF THE INVENTION

In a portable information apparatus, such as a smart phone and tablet PC, the thickness, the size, and the weight thereof have further decreased, so that functions to be mounted thereon have been limited in many cases. For example, Patent Document 1 discloses a configuration which enables extension of functions, such as a battery function, by mounting an extension unit having approximately the same shape as that of a portable information apparatus on the back surface of the portable information apparatus.

[Patent Document 1] Japanese Patent Application Laid-Open No. 2017-45043

SUMMARY OF THE INVENTION

The extension unit described in Patent Document 1 is used or carried in the state of being mounted on the portable information apparatus. Therefore, the extension unit has also been demanded to achieve the same reduction in thickness, size, and weight as that of the portable information apparatus, so that the function extension performance has been limited.

Then, the portable information apparatus has been demanded to connect external devices for further function extension, charging, and the like in addition to the extension unit described in Patent Document 1 described above. However, when the portable information apparatus is connected to such external devices, so that the processing load increases, the heat generation amount from a battery unit or an arithmetic unit built therein increases. In the portable information apparatus, however, the extension unit is mounted on the back surface serving as a main heat dissipation portion, and therefore sufficient heat dissipation performance may not be achievable.

The present invention has been made in view of the problems of former techniques. It is an object of the present invention to provide a docking unit capable of securing the heat dissipation performance of a portable information apparatus while extending the function of an electronic apparatus in which an extension unit is mounted on the portable information apparatus, and an electronic apparatus system having the docking unit.

A docking unit of the present disclosure has a docking portion capable of docking an electronic apparatus in which the mounting surface of an extension unit is detachably mounted on the back surface of a portable information apparatus, with the back surface of the extension unit on the top side, a holding portion holding the portable information apparatus at a predetermined position in the docking direction when the electronic apparatus is docked with the docking portion, and a forcibly moving portion forcibly moving the extension unit in the docking direction when the electronic apparatus is docked with the docking portion to thereby separate the extension unit from the portable information apparatus held with the holding portion to form a gap between the back surface of the portable information apparatus and the mounting surface of the extension unit.

The docking unit of the present disclosure may be configured so as to have an air supply fan and an air supply path causing the air supplied from the air supply fan to flow into the gap formed between the back surface of the portable information apparatus and the mounting surface of the extension unit.

The docking unit of the present disclosure may be configured so as to have a power transmission device capable of supplying power to a battery unit of the extension unit docked with the docking portion and another air supply path circulating the air supplied from the air supply fan to the power transmission device.

The docking unit of the present disclosure may be configured so that a mounting magnet is provided on the mounting surface of the extension unit, a sticking target material to which the mounting magnet can be stuck is provided on the back surface of the portable information apparatus, the docking portion has a concave shape into which the electronic apparatus can be inserted along the docking direction, and the forcibly moving portion has an attracting magnet which is provided on the bottom surface of the docking portion and attracts the mounting magnet from the back surface side of the extension unit.

The docking unit of the present disclosure may be configured so that the forcibly moving portion has a repulsion magnet which is provided on the side surface of the docking portion and generates repulsion force to the mounting magnet.

The docking unit of the present disclosure may be configured so as to have an extrusion mechanism for pressing and moving the extension unit docked with the docking portion in a direction opposite to the docking direction.

The docking unit of the present disclosure may be configured so that the extrusion mechanism moves the extension unit over a distance equal to or larger than the distance of the gap.

An electronic apparatus system of the present disclosure has the docking unit having the configuration described above, the portable information apparatus, and the extension unit.

According to the present disclosure, the heat dissipation performance of the portable information apparatus can be secured while extending the function of the electronic apparatus in which the extension unit is mounted on the portable information apparatus.

DETAILED DESCRIPTION OF THE INVENTION

Hereinafter, a docking unit according to the present invention is described in detail giving an embodiment suitable in the relationship with an electronic apparatus system having the docking unit with reference to the attached drawings.

Figure 1:
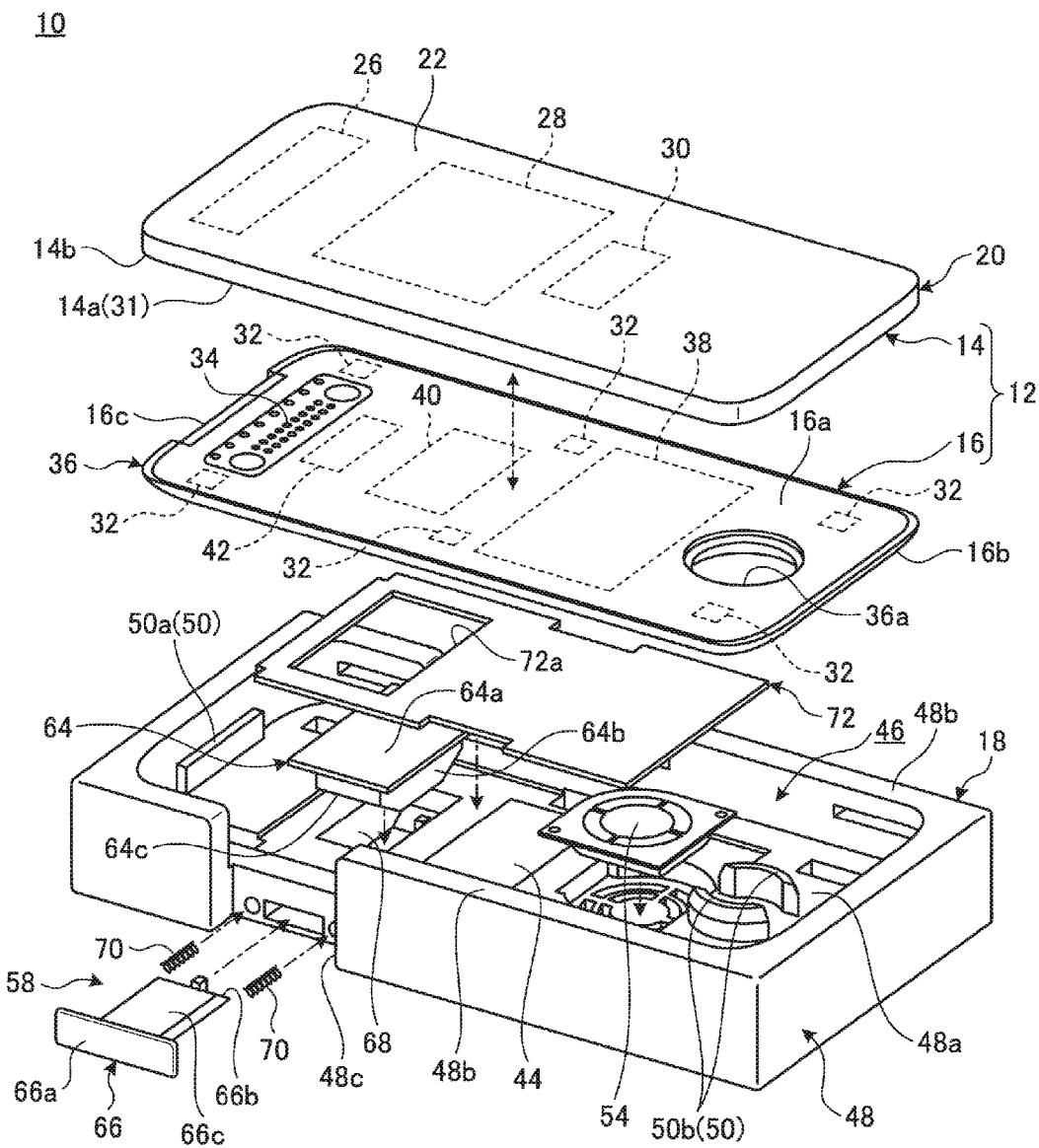
FIG. 1 is an exploded perspective diagram of an electronic apparatus system according to the present disclosure.
Figure 2:
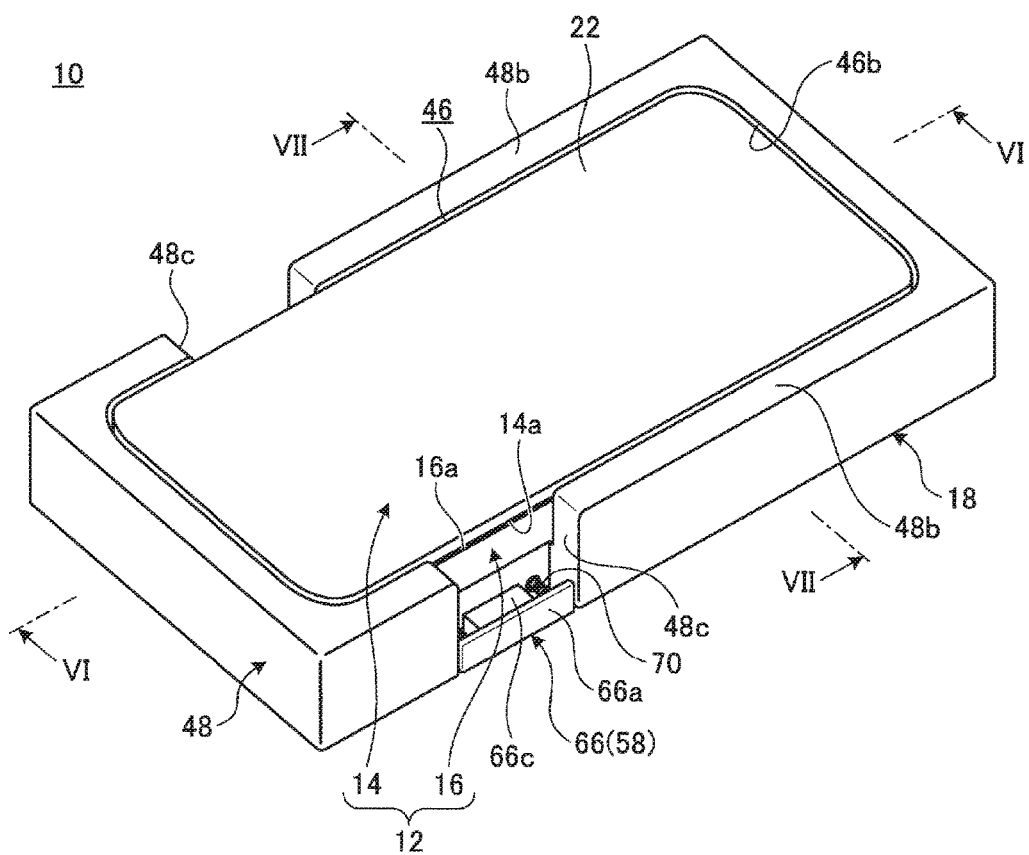
FIG. 2 is a perspective diagram of the electronic apparatus system of the present disclosure.

FIG. 1 is an exploded perspective diagram of an electronic apparatus system 10 according to the present disclosure. FIG. 2 is a perspective diagram of the electronic apparatus system 10 of the present disclosure. As illustrated in FIG. 1, the electronic apparatus system 10 has a portable information apparatus 14 and an extension unit 16 which are mounted to each other to configure an electronic apparatus 12, and a docking unit 18. As illustrated in FIG. 2, the electronic apparatus 12 can be docked with the docking unit 18.

Figure 3:
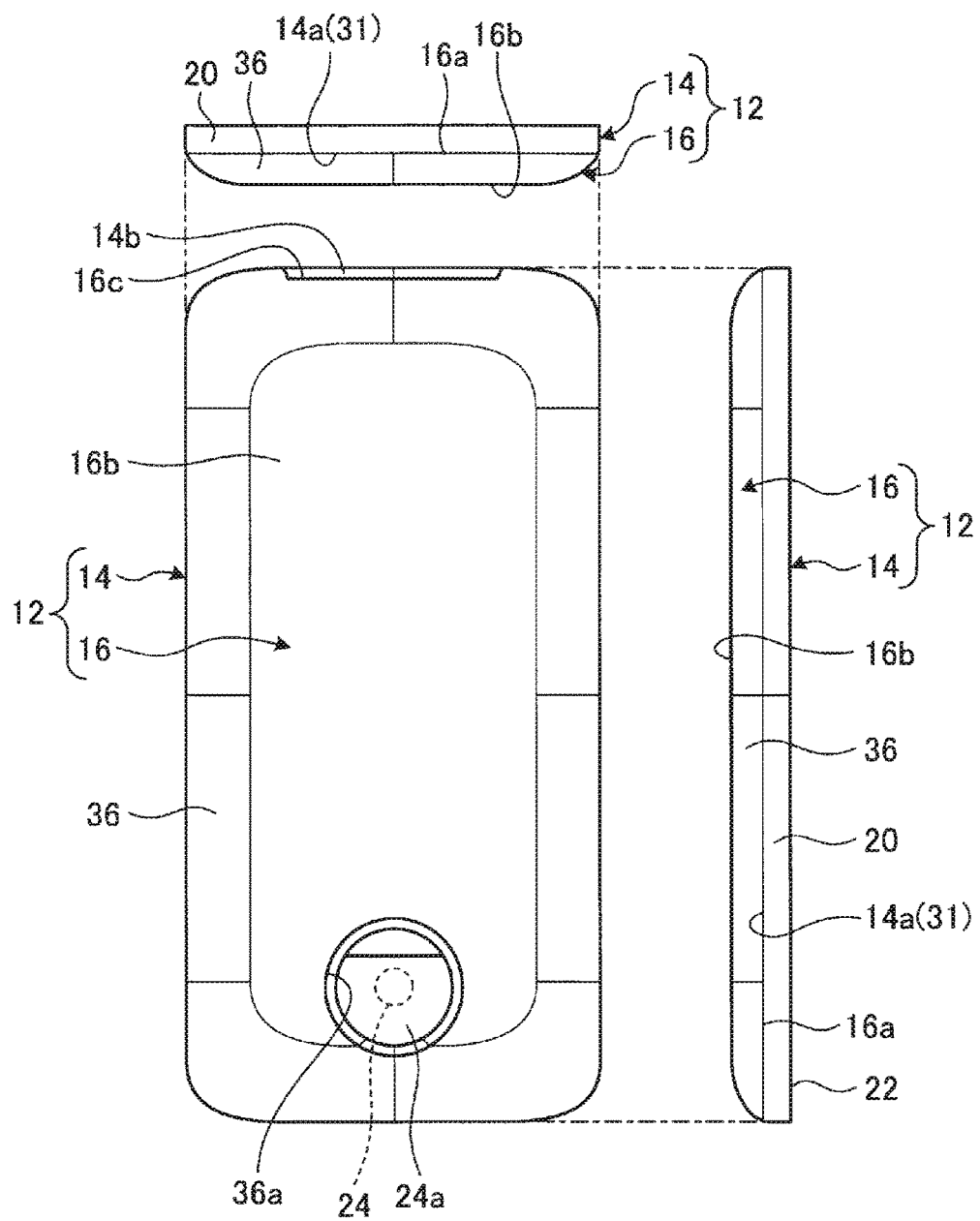
FIG. 3 is a configuration diagram of the electronic apparatus of the present disclosure viewed from the three surfaces of the plane, the back surface, and the side surface.

First, the configuration of the electronic apparatus 12 is described. FIG. 3 is a configuration diagram of the electronic apparatus 12 of the present disclosure viewed from the three surfaces of the plane, the back surface, and the side surface.

The electronic apparatus 12 is obtained by detachably mounting the extension unit 16 on a back surface 14a of the portable information apparatus 14 to extend the function of the portable information apparatus 14.

As illustrated in FIG. 1 and FIG. 3, the portable information apparatus 14 has a chassis 20, a display 22, a camera 24, a terminal portion 26, a battery unit 28, and a CPU 30. In the case of the present disclosure, the portable information apparatus 14 is a smart phone but the portable information apparatus 14 may be a tablet PC or the like, for example.

The chassis 20 is a box body having a flat plate shape in which the upper surface is opened and the opening upper surface is closed by the display 22. The chassis 20 is molded with a metal thin plate of aluminum, steel, stainless steel, or the like or resin, for example. The chassis 20 has at least a sticking target material 31 on the back surface 14a on which the extension unit 16 is mounted. The sticking target material 31 may be a material capable of being stuck to mounting magnets 32 which are a plurality of magnets provided in the extension unit 16 and, for example, steel, a magnet, and the like. In the case of the present disclosure, the chassis 20 has a steel plate serving as the sticking target material 31 on the entire back surface 14a. The sticking target material 31 may be provided only at positions corresponding to the mounting magnets 32. The terminal portion 26 is provided on the back surface 14a of the chassis 20. The terminal portion 26 is an electroconductive plate electrically connected to a connection terminal 34 of the extension unit 16.

The battery unit 28 and the CPU 30 are mounted in the chassis 20. The battery unit 28 is a power supply of the portable information apparatus 14. The CPU 30 is a central processing unit performing various kinds of processing of the portable information apparatus 14. In the chassis 20, a substrate, a wireless-communication module, and the like which are not illustrated are further provided.

The display 22 is a touch panel type liquid crystal display, for example. In the case of the present disclosure, the display 22 is provided so as to cover approximately the entire surface of the chassis 20.

Figure 6:
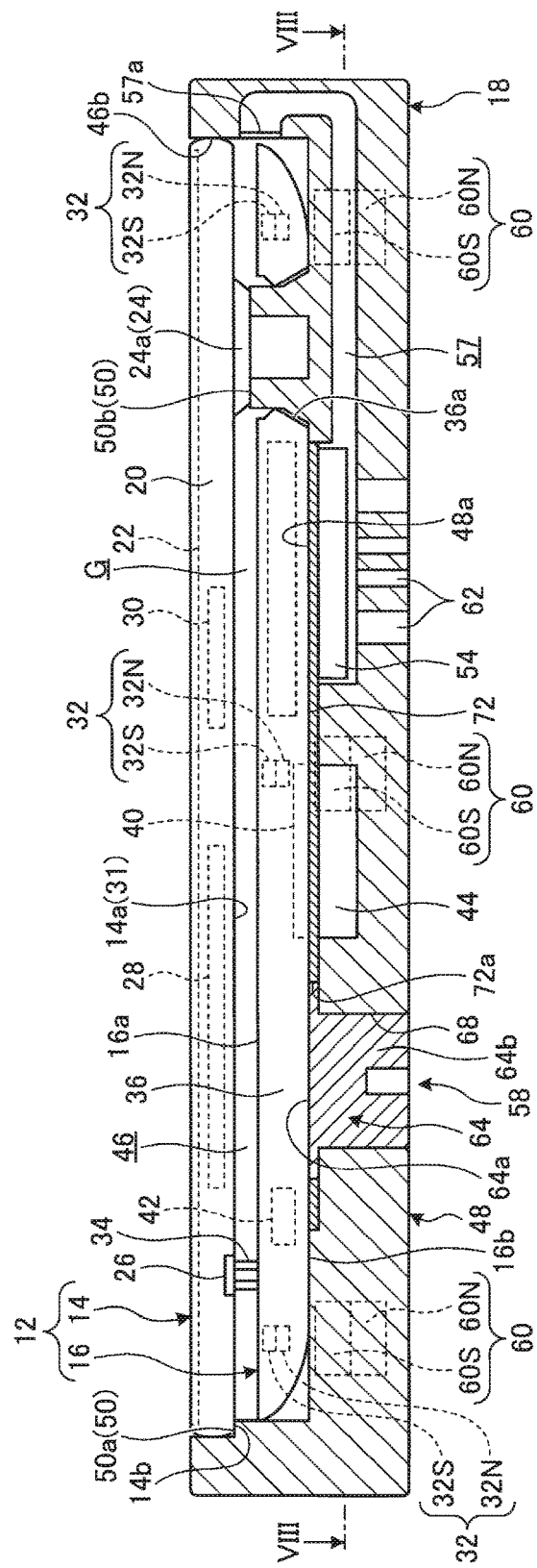
FIG. 6 is a cross-sectional view along the VI-VI line in FIG. 2.

The camera 24 is provided approximately at the center on one end side in the longitudinal direction of the back surface 14a of the chassis 20. The camera 24 is provided on a camera platform 24a of a disk shape bulged from the back surface 14a to be located at a position projected from the back surface 14a (FIG. 6).

As illustrated in FIG. 1 and FIG. 3, the extension unit 16 has a chassis 36, a battery unit 38, a power receiving device 40, and a wireless connection module 42.

The chassis 36 has an outer shape almost equal to or slightly smaller than the chassis 20 of the portable information apparatus 14. The chassis 36 is molded with resin, for example. In the case of the present disclosure, the surface of the chassis 36 serves as the mounting surface 16a of the extension unit 16 to the portable information apparatus 14. The chassis 36 has an approximately trapezoid shape in which the outer peripheral end surface decreases while inclining from the mounting surface 16a toward a back surface 16b on the back side. In the chassis 36, two or more of the mounting magnets 32 to be stuck to the sticking target material 31 of the portable information apparatus 14 are disposed. In the case of the present disclosure, one pair of the mounting magnet 32 are provided in the width direction of the chassis 36 and are disposed in three rows along the longitudinal direction, so that six mounting magnet 32 in total are provided. The connection terminal 34 electrically connected to the terminal portion 26 of the portable information apparatus 14 is provided on the mounting surface 16a. The connection terminal 34 retractably protrudes from the mounting surface 16a with a spring or the like which is not illustrated.

The chassis 36 has an opening 36a approximately at the center on one end side in the longitudinal direction. The opening 36a is a circular hole portion penetrating through the chassis 36 in the plate thickness direction. The opening 36a has an inner diameter size which allows the insertion of the camera platform 24a of the portable information apparatus 14 with almost no space.

The battery unit 38, the power receiving device 40, and the wireless connection module 42 are mounted in the chassis 36. The battery unit 38 functions as a rechargeable battery charging the battery unit 28 of the portable information apparatus 14 or as a power supply of the portable information apparatus 14 through the connection portion between the connection terminal 34 and the terminal portion 26. The power receiving device 40 is a device receiving power supply from the power transmission device 44 of the docking unit 18, which is described later, without contacting the same. The power received by the power receiving device 40 is transmitted to the battery unit 38. The wireless connection module 42 serves as an antenna module connecting by radio an external display, a projector device, or the like which are not illustrated and the extension unit 16 (electronic apparatus 12). In the chassis 36, a substrate and the like which are not illustrated are further mounted.

Therefore, in the electronic apparatus 12, the mounting magnets 32 of the extension unit 16 are stuck to the sticking target material 31 of the portable information apparatus 14, whereby the mounting surface 16a of the extension unit 16 can be physically mounted on the back surface 14a of the portable information apparatus 14. Herein, the camera platform 24a is inserted into the opening 36a to be disposed therein. Therefore, the camera 24 is usable through the opening 36a even in the state where the portable information apparatus 14 and the extension unit 16 are mounted to each other. When removing the extension unit 16 from the portable information apparatus 14, the chassis 20 and 36 may be held and separated from each other with fingertips, for example.

Figure 4:
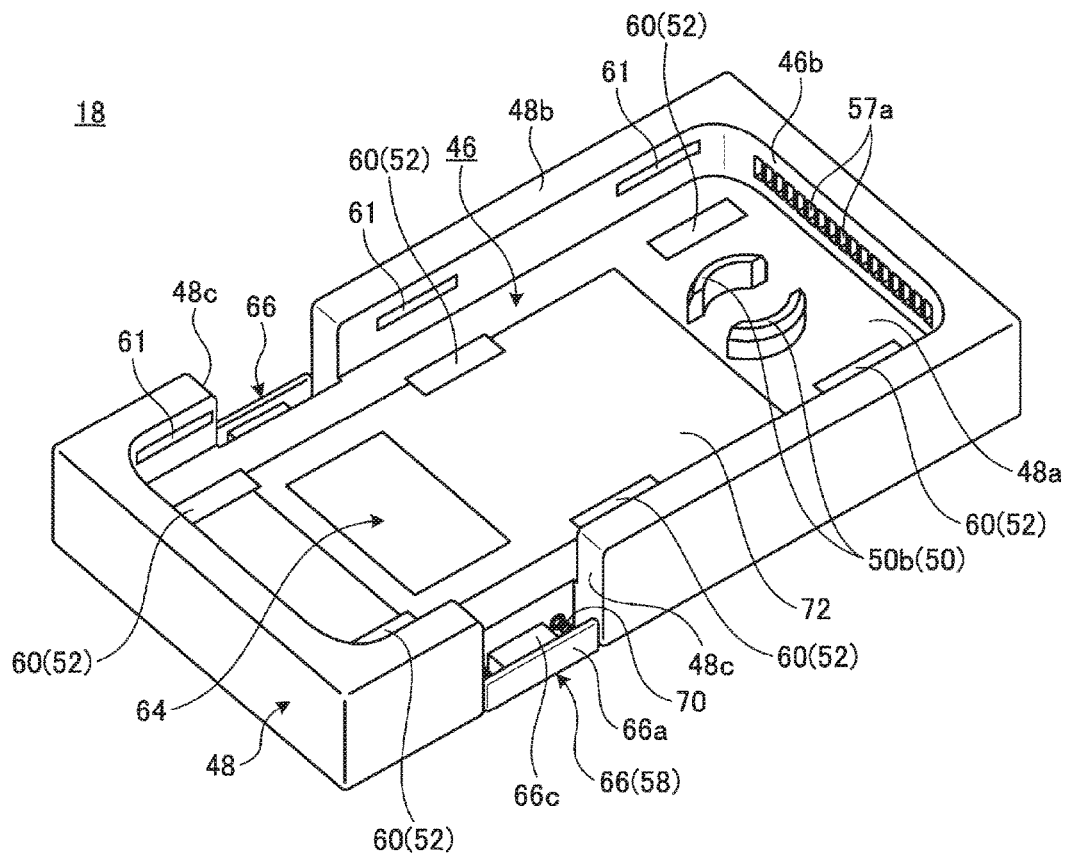
FIG. 4 is a perspective diagram of a docking unit of the present disclosure.
Figure 5:
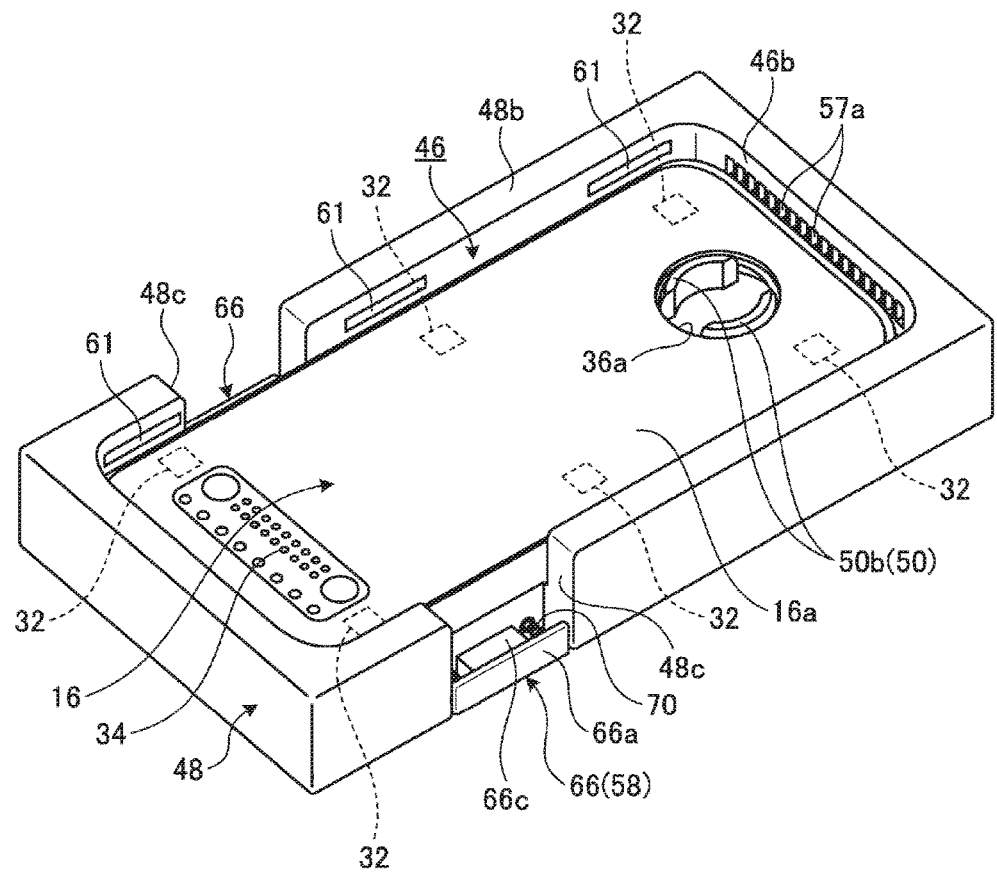
FIG. 5 is a perspective diagram illustrating a state where a portable information apparatus is removed from the state illustrated in FIG. 2.
Figure 7:
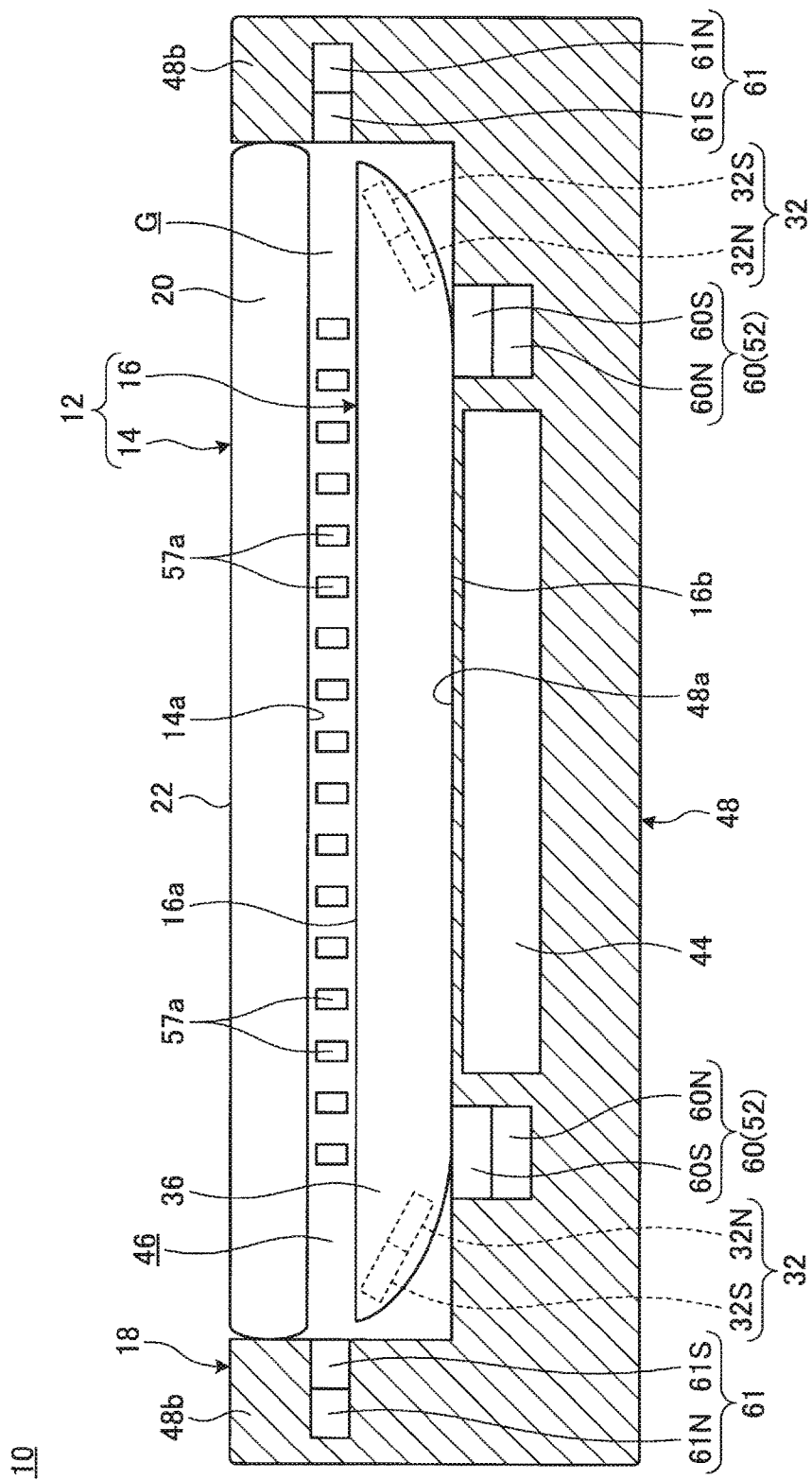
FIG. 7 is a cross-sectional view along the VII-VII line in FIG. 2.
Figure 8:
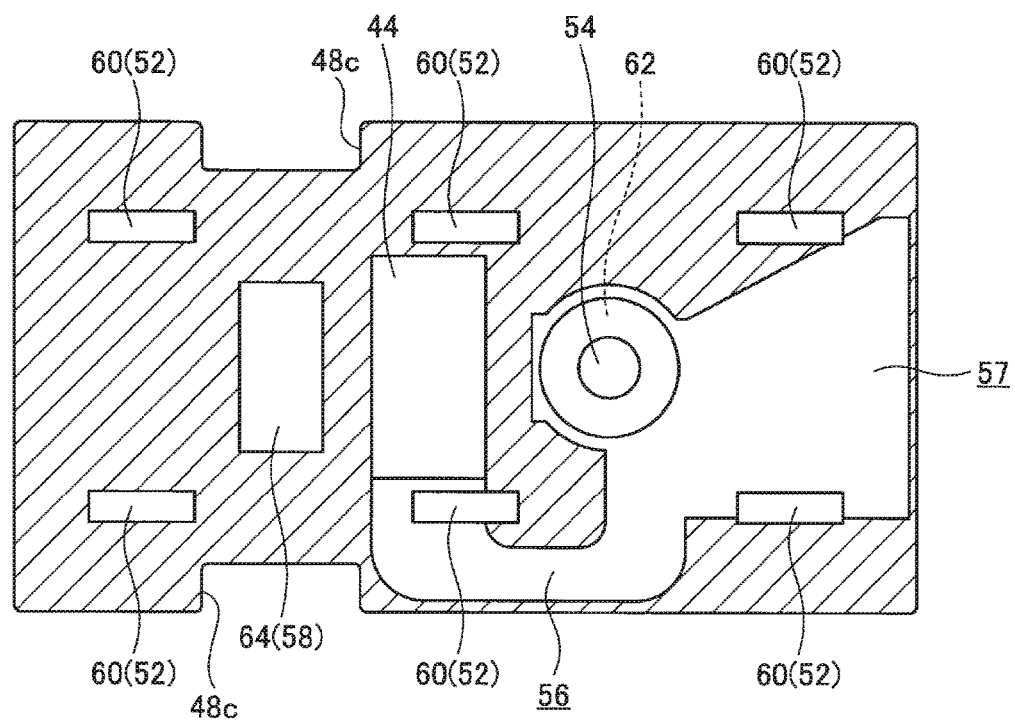
FIG. 8 is a cross-sectional view along the VIII-VIII line in FIG. 6.

Next, the configuration of the docking unit 18 is described. FIG. 4 is a perspective diagram of the docking unit 18 of the present disclosure. FIG. 5 is a perspective diagram illustrating a state where the portable information apparatus 14 is removed from the state illustrated in FIG. 2. FIG. 6 is a cross-sectional view along the VI-VI line in FIG. 2. FIG. 7 is a cross-sectional view along the VII-VII line in FIG. 2. FIG. 8 is a cross-sectional view along the VIII-VIII line in FIG. 6. FIG. 6 and FIG. 7 schematically illustrate the internal structure of the electronic apparatus system 10 of the present disclosure, in which cross-section hatching of the portable information apparatus 14 and the extension unit 16 is omitted in order to secure the ease of understanding of the drawings.

As illustrated in FIG. 1, FIG. 4, and FIG. 6, the docking unit 18 has a chassis 48 having a docking portion 46, a power transmission device 44, a holding portion 50, a forcibly moving portion 52, an air supply fan 54, a first air supply path 56, a second air supply path 57, and an extrusion mechanism 58.

The chassis 48 is a box body having the docking portion 46 having a concave shape on the upper surface side and is molded with resin, for example. The docking portion 46 has a concave shape into which the electronic apparatus 12 can be inserted in a laid-down state with the back surface 16b of the extension unit 16 on the top side. The electronic apparatus 12 is docked with the docking unit 18 by being inserted into the docking portion 46. Although described later in detail, when the electronic apparatus 12 is docked with the docking portion 46, the portable information apparatus 14 and the extension unit 16 are forcibly separated from each other. In the docking portion 46, the portable information apparatus 14 is held near an upper surface opening and the extension unit 16 lands on a bottom surface 48a. The chassis 48 has a notch-shaped portion 48c in each of side wall portions 48b and 48b facing each other in the lateral direction. The notch-shaped portions 48c are formed so as to penetrate through a part in the longitudinal direction of the side wall portions 48b from the upper end to the lower end. More specifically, the notch-shaped portions 48c are openings causing the docking portion 46 to communicate with the inside and the outside through the side wall portions 48b.

The power transmission device 44 supplies power to the battery unit 38 of the extension unit 16 docked with the docking portion 46 without contacting the same. The non-contact power supply system between the power receiving device 40 and the power transmission device 44 is not limited and known systems, such as an electromagnetic induction system utilizing a magnetic flux generated between coils and a resonance system of resonating an electric field or a magnetic field generated by coils to transmit power, are utilizable, for example.

The holding portion 50 holds the portable information apparatus 14 at a predetermined position in the docking portion 46 of the electronic apparatus 12 docked with the docking portion 46. As illustrated in FIG. 6 and FIG. 7, the portable information apparatus 14 is held near the upper surface opening of the docking portion 46 by the holding portion 50. The holding portion 50 is a stopper (locking portion) which allows the extension unit 16 on the top side to pass in the docking direction (downward in the present specification) of the electronic apparatus 12 to the docking portion 46 and, on the other hand, hooks the portable information apparatus 14 on the rear side to regulate moving beyond a predetermined position.

As illustrated in FIG. 1 and FIG. 6, the holding portion 50 has a tip locking surface 50a and camera locking surfaces 50b.

The tip locking surface 50a is a surface locking one end edge portion 14b (end portion opposite to the camera 24) of the back surface 14a of the portable information apparatus 14. The tip locking surface 50a is a level difference portion slightly overhung to the inside of the docking portion 46 from the inner surface of the docking portion 46. In the case of the present disclosure, the back surface 14a of the portable information apparatus 14 is configured so that at least the one end edge portion 14b is overhung from the outline of the extension unit 16 (FIG. 6). In the case of the present disclosure, the extension unit 16 has a concave portion 16c in an edge portion at a position overlapped with the one end edge portion 14b, so that the one end edge portion 14b is exposed through the concave portion 16c (FIG. 1). Then, the tip locking surface 50a locks the one end edge portion 14b to thereby allow the extension unit 16 to pass so as to be able to hold only the portable information apparatus 14. The camera locking surfaces 50b are surfaces locking a peripheral portion avoiding the camera 24 in the lower surface of the camera platform 24a. The camera locking surfaces 50b abut on the lower surface of the camera platform 24a through an opening 48b of the extension unit 16. In the case of the present disclosure, the camera locking surfaces 50b are the top surfaces of a pair of projections having a half-ring shape provided so as to avoid the camera 24.

The holding portion 50 holds the one end edge portion 14b on one end side in the longitudinal direction of the portable information apparatus 14 with the tip locking surface 50a and holds the camera platform 24a on the other side in the longitudinal direction of the portable information apparatus 14 with the camera locking surfaces 50b. Thus, the holding portion 50 stably holds the portable information apparatus 14 without rattling and regulates the portable information apparatus 14 from moving downward relative to the holding portion 50 in the docking portion 46. The holding portion 50 may have another configuration insofar as the holding portion 50 may be configured so as to allow the extension unit 16 to pass so as to hold only the portable information apparatus 14 in the docking direction of the electronic apparatus 12 to the docking portion 46. For example, the holding portion 50 may be configured so that the same level difference portion as that of the tip locking surface 50a is provided in place of the camera locking surfaces 50b to hold each of the one end edge portion 14b and the other-end edge portion on the opposite side in the longitudinal direction of the portable information apparatus 14, for example.

The forcibly moving portion 52 forcibly moves the extension unit 16 in the docking direction when the electronic apparatus 12 is docked with the docking portion 46. Thus, the forcibly moving portion 52 can separate the extension unit 16 from the portable information apparatus 14 held with the holding portion 50. As illustrated in FIG. 4, FIG. 6, and FIG. 7, the forcibly moving portion 52 has a plurality of attracting magnets 60.

The attracting magnets 60 are provided at positions corresponding to the mounting magnets 32 of the extension unit 16 docked with the docking portion 46. In the case of the present disclosure, six pieces of the attracting magnets 60 are provided so as to face the mounting magnets 32. Each attracting magnet 60 is disposed so that an S pole 60S faces the bottom surface 48a side (upper side) of the docking portion 46 and the opposite side (lower side) serves as an N pole 60N, for example. On the other hand, each mounting magnet 32 of the extension unit 16 is disposed so that an N pole 32N faces the back surface 16b side and an S pole 32S faces the mounting surface 16a side. Thus, the attracting magnets 60 generate attraction force between the attracting magnets 60 and the mounting magnets 32 of the extension unit 16 inserted into the docking portion 46. The attracting magnets 60 are set to generate magnetic force sufficiently higher than that of the mounting magnets 32. Therefore, the attraction force between the attracting magnet 60 and the mounting magnet 32 is sufficiently higher than the attraction force between the mounting magnet 32 and the sticking target material 31.

The forcibly moving portion 52 of the present disclosure further has a plurality of repulsion magnets 61. The repulsion magnets 61 each are provided on the side surface of the docking portion 46 at positions corresponding to the mounting magnets 32 of the extension unit 16 docked with the docking portion 46 (FIG. 4 and FIG. 7). In the case of the present disclosure, six pieces of the repulsion magnet 61 are provided so as to face the mounting magnets 32 of the extension unit 16 at the position where the portable information apparatus 14 on which the extension unit 16 is mounted is held with the holding portion 50. Each repulsion magnet 61 is disposed so that an S pole 61S faces the inside of the docking portion 46 and the opposite side (outside) serves as an N pole 61N (FIG. 7), for example. On the other hand, each mounting magnet 32 of the extension unit 16 is disposed inclining in the docking direction as illustrated in FIG. 7, so that the S pole 32S faces the S pole 61S. Thus, the repulsion magnets 61 are repulsive to the mounting magnets 32 of the extension unit 16 inserted into the docking portion 46.

Therefore, when the extension unit 16 is inserted into the docking portion 46, attraction force is generated between the S pole 60S of the attracting magnets 60 and the N pole 32N of the mounting magnets 32. Herein, the attraction force between the attracting magnet 60 and the mounting magnet 32 generates force higher than the attraction force between the mounting magnet 32 and the sticking target material 31. Therefore, when the electronic apparatus 12 is docked with the docking portion 46, the portable information apparatus 14 is held with the holding portion 50 and the extension unit 16 is drawn to the bottom surface 48a side by the attraction force from the attracting magnets 60. As a result, the extension unit 16 is forcibly separated from the portable information apparatus 14 to land on the bottom surface 48a, so that a gap G is formed between the back surface 14a of the portable information apparatus 14 and the mounting surface 16a of the extension unit 16 (FIG. 6). The gap G may have a distance which allows securing of the heat dissipation performance on the back surface 14a of the portable information apparatus 14 and allows smooth flow of the air supplied from the air supply fan 54 and is about 1 to 2 mm, for example.

The air supply fan 54 supplies air sucked from a suction port 62 having a slit shape opened in the bottom surface of the chassis 48 to the first air supply path 56 and the second air supply path 57 (FIG. 6 and FIG. 8).

The first air supply path 56 is a path communicating with the power transmission device 44 from air outlets in the side surface of the air supply fan 54. The power transmission device 44 is assumed to cause high heat generation among the various kinds of devices mounted in the docking unit 18. Then, the air supply fan 54 can cool the power transmission device 44 through the first air supply path 56.

The second air supply path (air supply path) 57 is a path communicating from the air outlets in the side surface of the air supply fan 54 to the docking portion 46. The second air supply path 57 is opened in the docking portion 46 through air outlets 57a formed in an inner surface 46b on one end side in the longitudinal direction of the docking portion 46 (FIG. 5 to FIG. 7). The inner surface 46b is a surface facing the inner surface on which the tip locking surface 50a of the docking portion 46 is provided, for example. As illustrated in FIG. 6 and FIG. 7, the air outlets 57a are provided at positions facing the gap G between the portable information apparatus 14 and the extension unit 16 which are separated from each other by being docked with the docking portion 46. Thus, the air supply fan 54 can supply air to the gap G through the second air supply path 57 to cool the back surface 14a which is a heat dissipation surface of the portable information apparatus 14. The air flowing into the gap G is discharged to the outside through the notch-shaped portions 48c, for example.

The extrusion mechanism 58 is a mechanism for removing the electronic apparatus 12 docked with the docking portion 46. The extrusion mechanism 58 has a pressing portion 64 and a pair of operating members 66 and 66.

Figure 9:
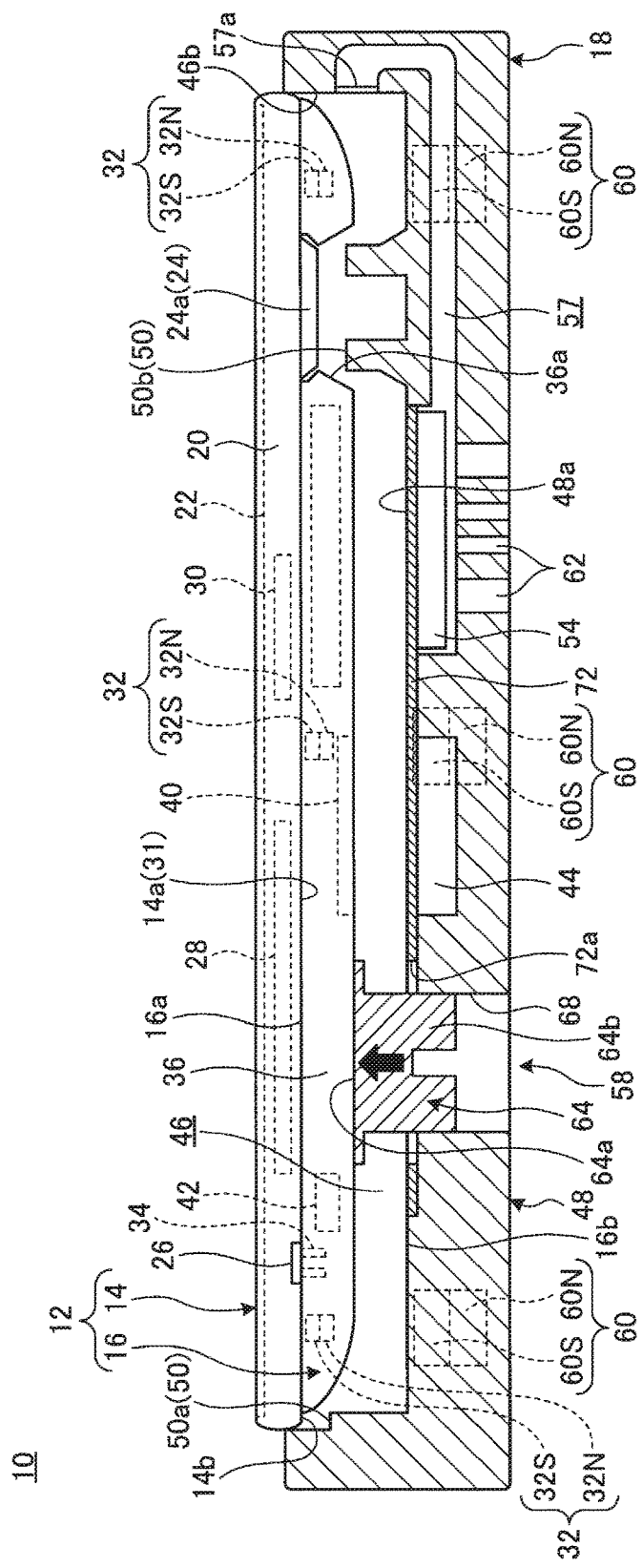
FIG. 9 is a cross-sectional view illustrating a state where an extrusion mechanism is operated from the state illustrated in FIG. 6.

The pressing portion 64 projects and retracts so as to freely rise from and sink into the bottom surface 48a of the docking portion 46. The pressing portion 64 is retractably inserted into a cylinder hole 68 which is formed in the chassis 48 so as to penetrate in the vertical direction from the bottom surface 48a (FIG. 6 and FIG. 9). The pressing portion 64 serves as a pressing surface 64a, the upper surface of which presses the back surface 16b of the extension unit 16. The pressing surface 64a is disposed to be flush with or at a position slightly lower than the bottom surface 48a at the initial lowest position. On the lower surface side of the pressing surface 64a, a piston portion 64b retractably inserted into the cylinder hole 68 is provided.

Each operating member 66 is disposed in each notch-shaped portion 48c of the chassis 48 and is provided retractably toward the inside of the chassis 48. The operating members 66 are mutually disposed with a symmetrical structure. Each operating member 66 has an operating surface 66a along the outer surface of the chassis 48 and a driving plate 66c which projects in the vertical direction from the operating surface 66a and is provided with an inclined surface 66b at the tip. The operating members 66 are always energized by energization force of a spring 70 in a direction where the operating members 66 protrudes to the outside of the chassis 48 (FIG. 1). The operating members 66 are disposed to be flush with or at a position slightly recessed from the outer surface of the chassis 48 at the initial position where the operating members 66 are projected to the outermost side (FIG. 2).

With respect to the extrusion mechanism 58, when the operating surface 66a of each operating member 66 is pressed to the inside against the energization force of the spring 70, the inclined surface 66b slidingly contacts an inclined surface 64c provided at the lower end of the piston portion 64b of the pressing portion 64 (FIG. 1). As a result, the piston portion 64b rises in the cylinder hole 68, so that the pressing surface 64a projects from the bottom surface 48a to press the back surface 16b of the extension unit 16 to press up the extension unit 16 (FIG. 9). The extrusion mechanism 58 can press up the extension unit 16 with a distance equal to or larger than the distance of the gap G or preferably a distance sufficiently larger than the distance of the gap G.

As illustrated in FIG. 1, the bottom surface 48a of the docking unit 18 is covered with a base plate 72 in the state where the power transmission device 44, the air supply fan 54, and the pressing portion 64 are attached to the inside of the chassis 48. More specifically, the surface of the base plate 72 forms a part of the bottom surface 48a of the docking portion 46. The base plate 72 has a hole portion 72a which causes the pressing portion 64 to pass.

Next, the docking operation of the electronic apparatus 12 to the docking unit 18 is described.

As the electronic apparatus 12, it is a matter of course that the portable information apparatus 14 is usable alone but the extension unit 16 may be mounted on the portable information apparatus 14. Thus, with respect to the electronic apparatus 12, the battery function and the like of the portable information apparatus 14 are extended with hardly impairing the portability and the like.

When the electronic apparatus 12, in which the extension unit 16 is mounted on the portable information apparatus 14, is docked with the docking unit 18, the electronic apparatus 12 is inserted into the docking portion 46 with the back surface 16b of the extension unit 16 on the top side. Thus, the portable information apparatus 14 is held with the holding portion 50. Subsequently, the extension unit 16 is separated from the portable information apparatus 14 to be drawn downward by the attraction force between the attracting magnets 60 and the mounting magnets 32 and the repulsion force between the repulsion magnets 61 and the mounting magnets 32. More specifically, the attracted state between the mounting magnet 32 and the sticking target material 31 is canceled. As a result, the gap G is formed between the portable information apparatus 14 and the extension unit 16 (FIG. 6 and FIG. 7). The connection terminal 34 of the extension unit 16 is configured so as to be projectable and retractable. Even in the state where the extension unit 16 is separated from the portable information apparatus 14, the connection state with the terminal portion 26 is maintained (FIG. 6).

Thus, the electronic apparatus system 10, in which the electronic apparatus 12 is docked with the docking unit 18, can charge the battery unit 38 of the extension unit 16 and the battery unit 28 of the portable information apparatus 14 through the power receiving device 40 from the power transmission device 44, for example. Furthermore, the electronic apparatus system 10 can transmit images, sounds, and the like reproduced with the portable information apparatus 14 from the wireless connection module 42 of the extension unit 16 to an external display or the like to display the same, for example. Furthermore, the electronic apparatus system 10 can continue the current application (charging) to the portable information apparatus 14 and the extension unit 16 also during the connection by radio with the external display or the like.

When the portable information apparatus 14 outputs images, such as moving images, while performing the current application (charging) to the battery unit 28 as described above, the load of the battery unit 28 and the load of CPU 30 increase, so that high heat generation arises. In this respect, in the electronic apparatus system 10, the back surface 14a serving as the heat dissipation surface of the portable information apparatus 14 is separated from the extension unit 16 through the gap G. Therefore, the electronic apparatus system 10 can secure the heat dissipation performance from the portable information apparatus 14 even in the state where the electronic apparatus 12 is docked with the docking unit 18. Furthermore, the electronic apparatus system 10 can cause the air supplied from the air supply fan 54 to flow into the gap G between the portable information apparatus 14 and the extension unit 16 docked with the docking unit 18 through the second air supply path 57. Thus, the electronic apparatus system 10 can more certainly cool the back surface 14a of the portable information apparatus 14.

On the other hand, when the electronic apparatus 12 docked with the docking unit 18 is removed, the operating surfaces 66a of the two operating members 66 and 66 of the extrusion mechanism 58 are simultaneously pressed to the inside with fingertips or the like. Thus, the pressing surface 64a is projected from the bottom surface 48a of the docking portion 46 to press the back surface 16b of the extension unit 16 as illustrated in FIG. 9. Thus, the extension unit 16 is pressed upward, which is a direction opposite to the docking direction, in the docking portion 46. When the mounting magnets 32 are pressed up to the outside of the range where the attraction force from the attracting magnets 60 considerably act, the extension unit 16 is mounted on the portable information apparatus 14 while pressing up the portable information apparatus 14. Then, the electronic apparatus 12 pressed up as illustrated in FIG. 9 is lifted by passing a fingertip through the notch-shaped portion 48c, for example, whereby the electronic apparatus 12 can be easily removed from the docking unit 18.

Figure 10:
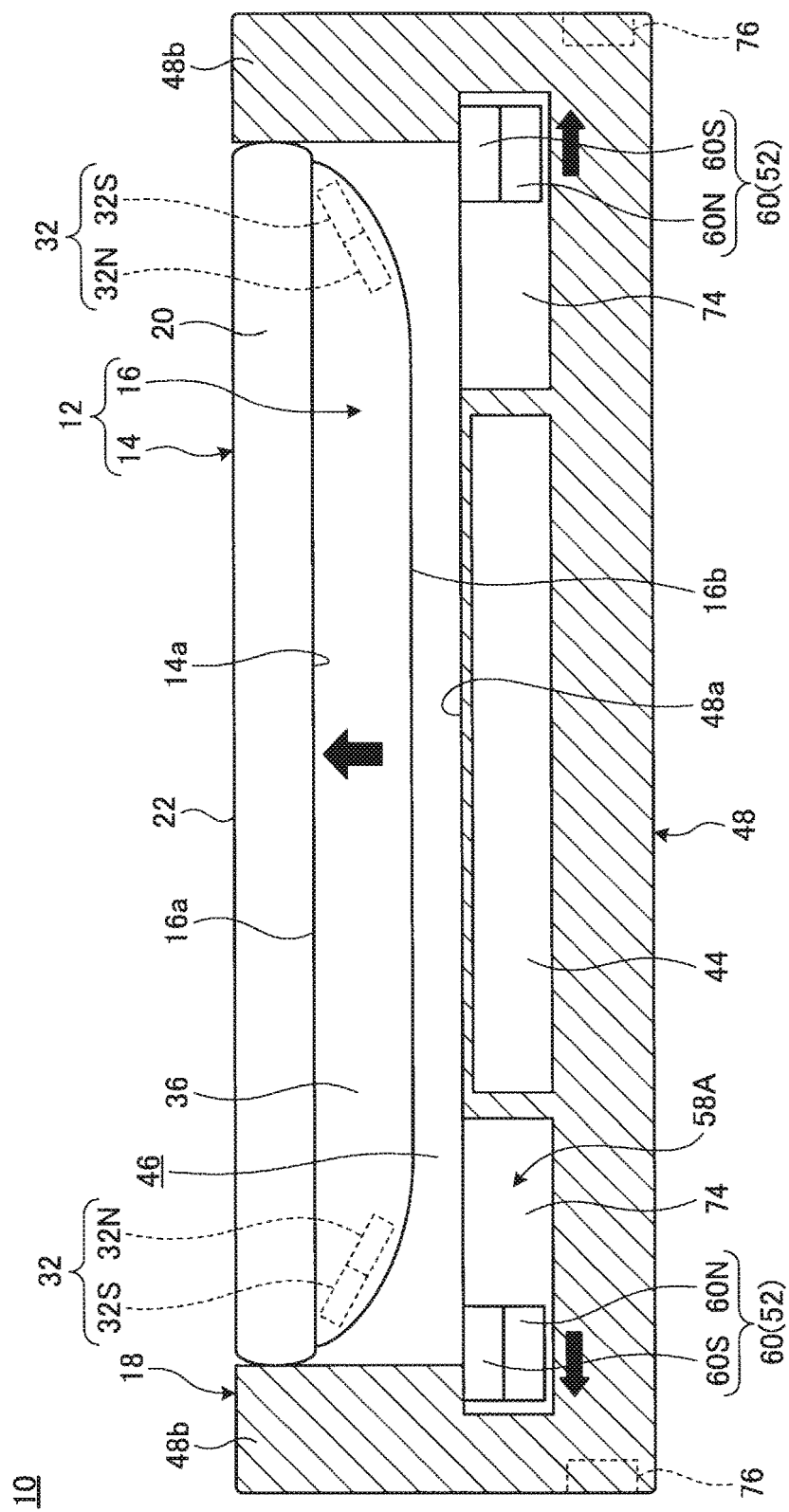
FIG. 10 is a cross-sectional view of an electronic apparatus system having an extrusion mechanism according to a modification.

FIG. 10 is a cross-sectional view of the electronic apparatus system 10 having an extrusion mechanism 58A according to a modification.

The extrusion mechanism 58A illustrated in FIG. 10 has slide mechanisms 74 causing the attracting magnets 60 to slide and operating members 76 driving the slide mechanisms 74.

The slide mechanisms 74 support the attracting magnets 60 so as to be slidable along a direction from the center side to the outside of the chassis 48, specifically the width direction of the extension unit 16 (direction in which the S pole 32S and the N pole 32N of the mounting magnet 32 are arranged). The operating member 76 is disposed in each notch-shaped portion 48c of the chassis 48 similarly to the above-described operating member 66 and is energized so as to be projectable from and retractable to the center side of the chassis 48 under the energization action of a spring similar to the spring 70. The extrusion mechanism 58A has a structure in which, when the operating members 76 are pressed in by the slidingly contacting action of a link mechanism, an inclined surface, or the like (not illustrated), the attracting magnets 60 slide.

In the extrusion mechanism 58A, the attracting magnets 60 are located at the same positions as those in the state illustrated in FIG. 7 before the operating members 76 are pressed in. Therefore, the S pole 60S faces the N pole 32N of the mounting magnet 32. More specifically, the attracting magnets 60 can function as the forcibly moving portion 52. In the extrusion mechanism 58A, however, when the operating members 76 are pressed in from this state, the attracting magnets 60 slide, the S pole 60S is located as a position facing the S pole 32S of the mounting magnet 32 as illustrated in FIG. 10. As a result, repulsion force arises between the attracting magnet 60 and the mounting magnet 32, and then the extension unit 16 is pressed up by the repulsion force to be mounted on the portable information apparatus 14.

Figure 11:
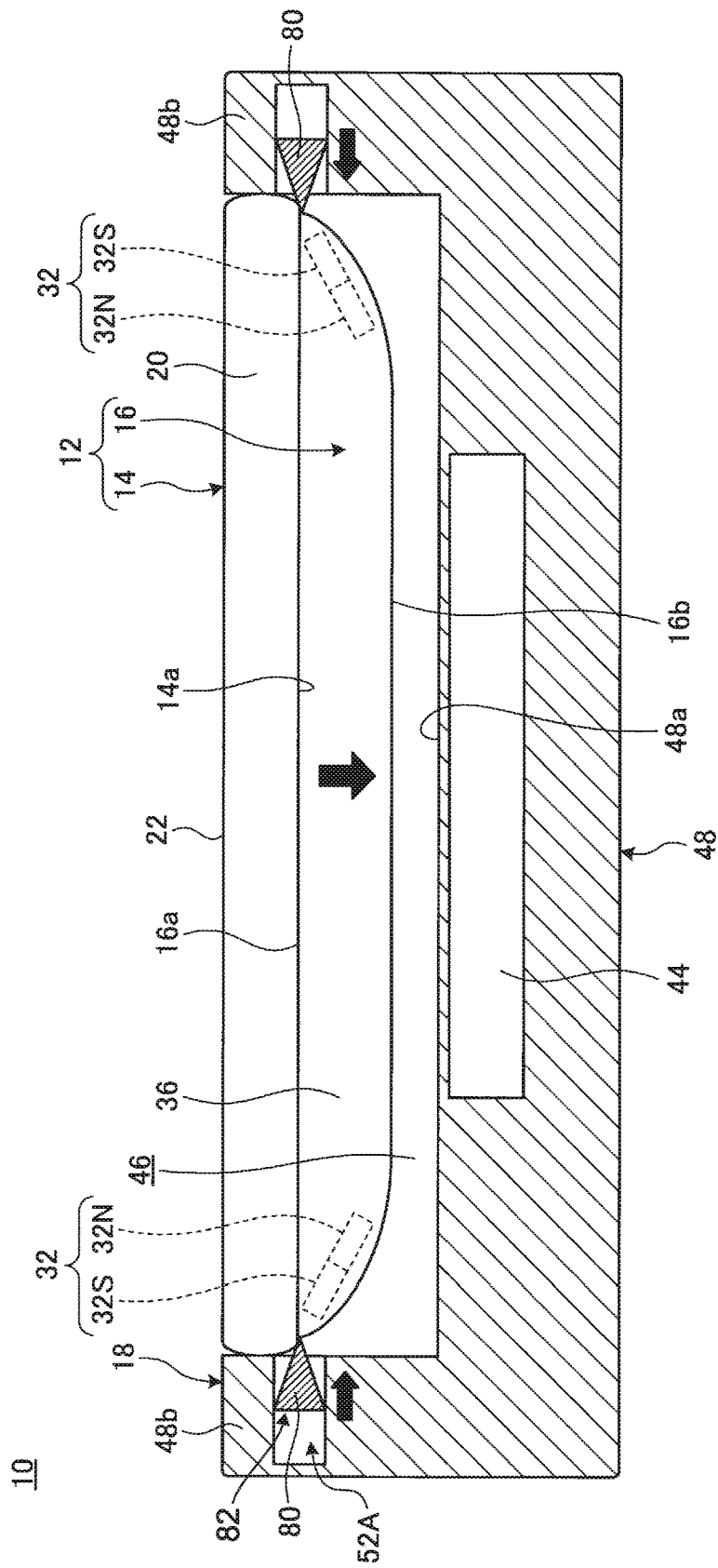
FIG. 11 is a cross-sectional view of an electronic apparatus system having a forcibly moving portion according to a modification.

FIG. 11 is a cross-sectional view of an electronic apparatus system 10 having a forcibly moving portion 52A according to a modification.

The forcibly moving portion 52A illustrated in FIG. 11 has a pair of wedge members 80 and 80 mechanically separating the extension unit 16 from the portable information apparatus 14 in place of the attracting magnets 60.

Each wedge member 80 is a tapered member having an approximately triangle shape in the cross section. The wedge members 80 are mutually disposed with a symmetrical structure. The tip of each wedge member 80 can enter between the back surface 14a of the portable information apparatus 14 and the mounting surface 16a of the extension unit 16 (between the mounting surfaces) in the state where the portable information apparatus 14 is held with the holding portion 50. Each wedge member 80 projects and retracts so as to freely rise from and sink to the inside of the docking portion 46 through a slide mechanism 82 formed in each side wall portion 48b of the docking portion 46. The slide mechanism 82 has a sensor detecting the state where the portable information apparatus 14 is locked by the holding portion 50, for example. The slide mechanism 82 further has an electric motor which causes each wedge member 80 to enter between the mounting surfaces of the portable information apparatus 14 and the extension unit 16 based on the detection result of the sensor. The slide mechanism 82 may be configured so as to cause the wedge members 80 to project and retract by a manual mechanism of pressing in a predetermined operating member to operate a linkage mechanism or the like.

Therefore, with respect to the docking unit 18 having the forcibly moving portion 52A, when the extension unit 16 is separated from the portable information apparatus 14 by the wedge members 80, the extension unit 16 falls to the bottom surface 48a with gravity. As a result, a gap G similar to the gap illustrated in FIG. 6 is formed between the portable information apparatus 14 and the extension unit 16. With respect to the docking unit 18 having the forcibly moving portion 52A, when the electronic apparatus 12 is removed in the state where the wedge members 80 are housed in the side wall portions 48b, the extrusion mechanism 58 may be operated.

As described above, the docking unit 18 of the present disclosure has the docking portion 46 capable of docking of the electronic apparatus 12 in which the mounting surface 16a of the extension unit 16 is detachably mounted on the back surface 14a of the portable information apparatus 14 with the back surface 16b of the extension unit 16 on the top side, the holding portion 50 holding the portable information apparatus 14 at a predetermined position in the docking direction when the electronic apparatus 12 is docked with the docking portion 46, and the forcibly moving portion 52 (52A) forcibly moving the extension unit 16 in the docking direction when the electronic apparatus 12 is docked with the docking portion 46 to thereby separate the extension unit 16 from the portable information apparatus 14 held with the holding portion 50 to form the gap G between the back surface 14a of the portable information apparatus 14 and the mounting surface 16a of the extension unit 16.

Accordingly, when the electronic apparatus 12 is docked with the docking unit 18, the extension unit 16 is separated from the portable information apparatus 14, so that the back surface 14a of the portable information apparatus 14 is opened. Therefore, the docking unit 18 can secure the heat dissipation performance of the portable information apparatus 14 in the docked state while extending the function of the electronic apparatus 12. As a result, even when the electronic apparatus system 10 causes the portable information apparatus 14 to perform processing with a high load in the state where the electronic apparatus 12 is docked with the docking unit 18, for example, the portable information apparatus 14 can be efficiently cooled, so that the occurrence of poor operation of the portable information apparatus 14 or the extension unit 16 due to an excessive heat generation amount can be prevented.

The docking unit 18 has the air supply fan 54 and the second air supply path 57 causing the air supplied from the air supply fan 54 to flow into the gap G formed between the back surface 14a of the portable information apparatus 14 and the mounting surface 16a of the extension unit 16. Thus, the docking unit 18 can more certainly and more efficiently cool the portable information apparatus 14 in the docked state.

It is a matter of course that the present invention is not limited to the embodiments described above and can be freely altered without deviating from the scope of the present invention.

I claim:

1. A docking unit comprising:
a docking portion capable of docking of an electronic apparatus in which a mounting surface of an extension unit is detachably mounted on a back surface of a portable information apparatus;
a holding portion holding the portable information apparatus at a predetermined position in a docking direction when the electronic apparatus is docked with the docking portion; and
a forcibly moving portion forcibly moving the extension unit in the docking direction when the electronic apparatus is docked with the docking portion to thereby separate the extension unit from the portable information apparatus held with the holding portion to form a gap between the back surface of the portable information apparatus and the mounting surface of the extension unit.

2. The docking unit according to claim 1, further comprising:
an air supply fan; and
an air supply path causing air supplied from the air supply fan to flow into the gap between the back surface of the portable information apparatus and the mounting surface of the extension unit.

3. The docking unit according to claim 2, further comprising:
a power transmission device capable of supplying power to a battery unit of the extension unit docked with the docking portion; and
another air supply path circulating the air supplied from the air supply fan to the power transmission device.

4. The docking unit according to claim 1, wherein:
a mounting magnet is on the mounting surface of the extension unit; and
a sticking target material to which the mounting magnet can be stuck is on the back surface of the portable information apparatus;
the docking portion has a concave shape into which the electronic apparatus can be inserted along the docking direction; and the forcibly moving portion has an attracting magnet on a bottom surface of the docking portion and attracts the mounting magnet from a side of the back surface of the extension unit.

5. The docking unit according to claim 4, wherein:

the forcibly moving portion has a repulsion magnet on a side surface of the docking portion and generates repulsion force to the mounting magnet.

6. The docking unit according to claim 1, further comprising:

an extrusion mechanism for pressing and moving the extension unit docked with the docking portion in a direction opposite to the docking direction.

7. The docking unit according to claim 6, wherein:

the extrusion mechanism moves the extension unit over a distance equal to or larger than a distance of the gap.

8. An electronic apparatus system, comprising:

a docking unit having:

a docking portion capable of docking of an electronic apparatus in which a mounting surface of an extension unit is detachably mounted on a back surface of a portable information apparatus;

a holding portion holding the portable information apparatus at a predetermined position in a docking direction when the electronic apparatus is docked with the docking portion; and a forcibly moving portion forcibly moving the extension unit in the docking direction when the electronic apparatus is docked with the docking portion to thereby separate the extension unit from the portable information apparatus held with the holding portion to form a gap between the back surface of the portable information apparatus and the mounting surface of the extension unit, the portable information apparatus, and the extension unit.

* * * * *